H. N. ATWOOD AND G. B. BAINS, 3D.
METHOD OF PRODUCING COMPOSITE LAMINATED STRUCTURES.
APPLICATION FILED DEC. 24, 1920.
1,403,143.                                     Patented Jan. 10, 1922.
                                                   2 SHEETS—SHEET 1.
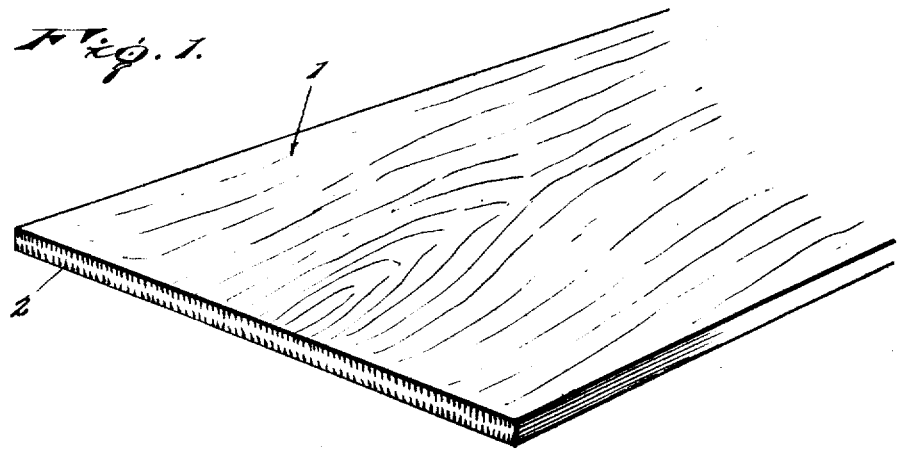
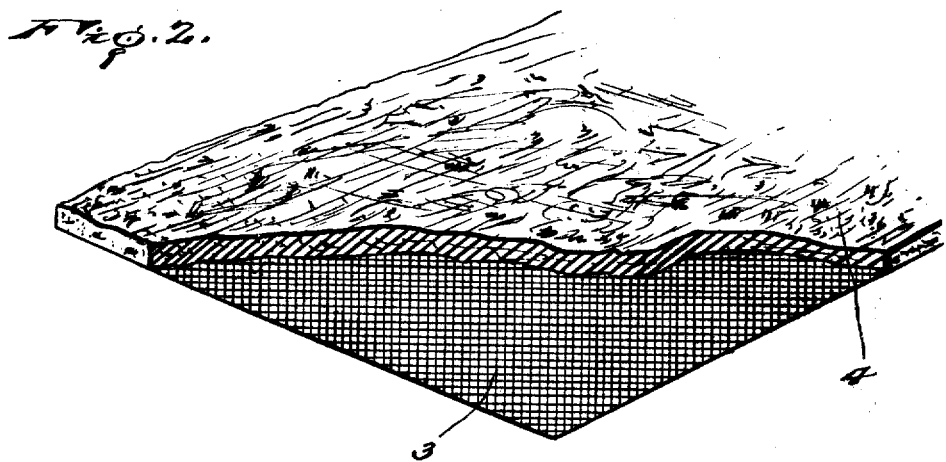
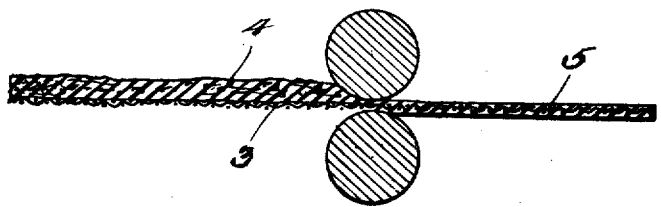
Inventors
H. N. Atwood,
G. B. Bains, 3rd.
By Lloyd Lacey, Attorneys H. N. ATWOOD AND G. B. BAINS, 3D.
METHOD OF PRODUCING COMPOSITE LAMINATED STRUCTURES.
APPLICATION FILED DEC. 24, 1920.
1,403,143.
Patented Jan. 10, 1922.
2 SHEETS—SHEET 2.
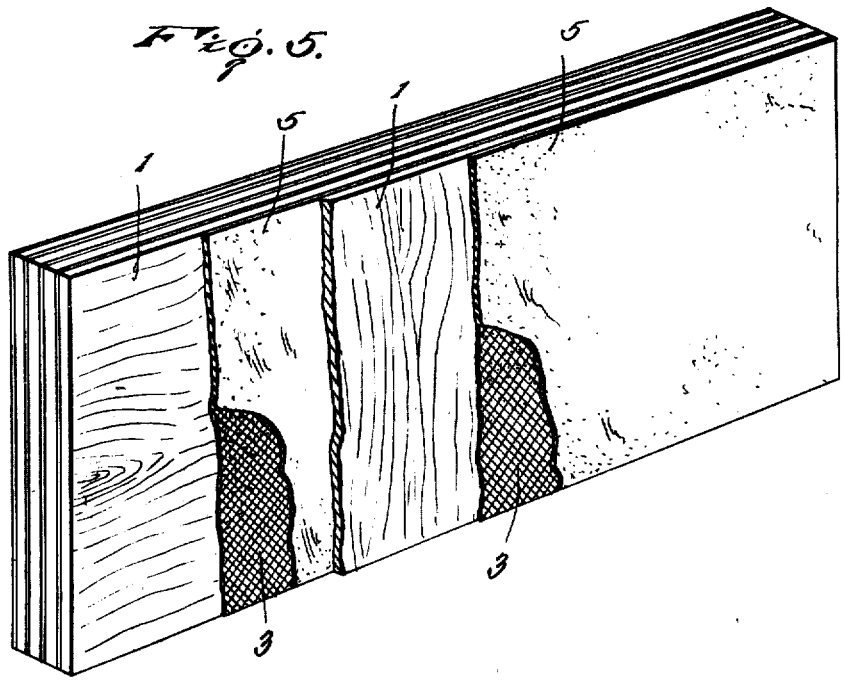
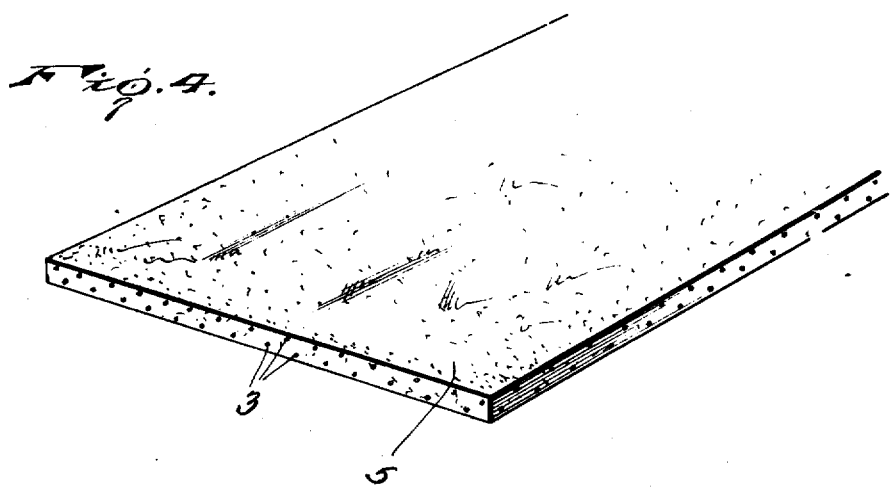
Inventors
H. N. Atwood,
G. B. Bains, 3rd.
By Lacy & Lacy, Attorneys

UNITED STATES PATENT OFFICE.

HARRY N. ATWOOD AND GEORGE B. BAINS, 3d, OF READING, PENNSYLVANIA.

METHOD OF PRODUCING COMPOSITE LAMINATED STRUCTURES.

1,403,143.   Specification of Letters Patent.   Patented Jan. 10, 1922.

Application filed December 24, 1920. Serial No. 432,936.

*To all whom it may concern:*

Be it known that we, HARRY N. ATWOOD and GEORGE B. BAINS, 3d, citizens of the United States, residing at Reading, in the county of Berks and State of Pennsylvania, have invented certain new and useful Improvements in Methods of Producing Composite Laminated Structures, of which the following is a specification.

The present invention has as its general object to evolve a novel method of producing a composite laminated structure.

Heretofore, it has been customary to unite the veneer plies or slabs of wood by the use of various kinds of water-proof adhesives or cements so as to produce a composite laminated structure. In such a structure, however, the wood laminæ are to a greater or less extent exposed so that the laminated structure is subject to the deteriorating influences of any moisture with which it comes in contact or to which it is subjected. On the other hand, where the opposite conditions prevail, the natural moisture content of the wood laminæ is liable to be driven out so that the wood loses some of the properties which it originally possessed. Therefore the permanency of composite laminated structures such as described, and the adaptability of these structures to various uses is dependent to a greater or less degree upon the conditions under which the structures are to be used. In consideration of the foregoing, it is one of the more specific objects of the invention to evolve a method whereby there may be produced a composite laminated structure which will be substantially proof against moisture absorption and will also not be subject to loss of the original properties of any of its component parts due to evaporation or the driving off of the volatile or moisture contents.

The invention contemplates the union of wood plies through the medium of rubber, and another important object of the invention is to evolve a method whereby this union may be effected in such a manner as to bring about incorporation of the uniting or bonding medium with the plies to be united or bonded together so that the union will be more than a superficial one and the permanency of the product will be assured.

Other objects of the invention will be made evident in the description which is to follow.

In the accompanying drawings:

Figure 1 is a perspective view illustrating a wood ply which has been treated by a preliminary step of the method and which is to form a component part of the finished product resulting from the carrying out of the method;

Figure 2 is a perspective view illustrating one step in the production of a bonding ply;

Figure 3 is a sectional view illustrating a further step in the production of the bonding ply;

Figure 4 is a perspective view of a portion of one of the completed bonding plies;

Figure 5 is a perspective view, parts being broken away and parts being shown in section, illustrating the structure of the composite product of the method.

The first steps in the method of the invention consist in preparing the wood and bonding plies. One of the wood plies is illustrated in Figure 1 of the drawings and indicated in general by the numeral 1 and this ply may be of veneer either produced by slicing or rotary cutting, or it may be in the nature of a slab of wood of the required thickness, the marginal contour and dimensions of the slab being varied as desired. In preparing this slab, the same is dipped, immersed, coated, or otherwise treated with some suitable rubber solvent such for example as a solution of rubber in benzol, it being understood however that any liquid rubber solvent found suitable for the purpose may be employed and that the invention is not in any way limited to the use of any particular solvent. In treating the wood ply with rubber solvent as above pointed out, the ply will become impregnated to a greater or less degree with the solvent, and the manner of treating the ply with the solvent and the period of such treatment may be regulated so as to control the degree of impregnation of the ply with the solvent, as the judgment of the operator may dictate. In Figure 1 of the drawings a portion of the ply 1 is shown in section, and the solvent which has entered the pores of the wood is indicated in this figure by the numeral 2. Not only does the solvent enter the pores of the wood ply, but the treatment of the ply with the solvent may be so controlled, if desired, as to produce a film, or coating of the solvent upon the surfaces of the ply, of a more or less appreciable thickness.

In preparing the bonding plies, a sheet 3 of foraminous material, such for example as wire mesh, is preferably first cleaned so as to remove therefrom all accumulations of foreign matter, grease, etc., and there is then applied to either or both sides of the sheet a coating 4 of rubber or a composition of rubber and other materials in a plastic state, this step in the method being clearly illustrated in Figure 2 of the drawings. The thickness of the coating 4 will be determined by experience and therefore what is shown in Figure 2 is merely illustrative in general of this step of the method and likewise the thickness or gage of the foraminous material may be varied as desired as also the nature of this material, and the marginal contour of the foraminous sheet and its dimensions may also be varied as for example in accordance with the contour and dimensions of the wood plies 1. Having applied to the foraminous sheet 3 the coating 4 as above described, the composite sheet thus produced is passed between calendering rolls or otherwise treated, as shown for example in Figure 2 is merely illustrative in general coating 4 and force the same into the meshes or interstices of the sheet 3 so that as the product issues from between the calendering rolls, it will be in the nature of a flat and relatively smooth sheet of uncured rubber or a composition of rubber and other materials, in which sheet is more or less completely embedded the foraminous sheet 3, the rubber constituent of this sheet being presented or exposed at both faces of the sheet as a unit.

The finished bonding sheet produced as above described is illustrated in Figure 4 of the drawings and indicated in general by the numeral 5, and having produced the required number of these bonding sheets or plies and the required number of the impregnated wood plies 1, the plies are alternately arranged and assembled in superposed relation until the assemblage is of a predetermined thickness. Figure 5 of the drawings illustrates the completed product and it will be observed from this figure that the grain in alternate plies 1 extends non-parallel. That is to say the grain in one ply may run at right angles or at any other desired angle to the grain of the next adjacent ply 1, and this angular relative disposition of adjacent plies may be varied within wide limits so long as the grain in adjacent plies is non-parallel. Likewise it will be observed by reference to Figures 2 and 5 that the sheets 3 are so cut and so disposed with relation to the grain of adjacent plies 1 that the strands defining the mesh will run non-parallel to the line of extent of the grain in adjacent plies 1, preferably at an angle of forty-five degrees to the grain of the said plies 1.

Having assembled the required number of wood and bonding plies in superposed relation in the manner above pointed out, and as shown in the drawings, the assemblage as a whole is subjected to pressure and heat to effect vulcanization of the rubber constituent of the bonding plies, and during this step in the method, a greater or less percentage of the contained moisture in the wood plies 1 will be converted into steam thus assisting in the process of vulcanization and also reliquifying or converting to a plastic state the impregnating rubber solvent carried by the plies 1 and causing this solvent to take up and carry into the pores of the said plies a greater or less quantity of the rubber constituent of the bonding plies.

As a result of the step of vulcanization, a greater or less percentage of the rubber constituent of the bonding plies is carried into and becomes intimately incorporated in the wood plies so that the bond between the wood and bonding plies is more intimate than a superficial one. Thus by the method above recited there is obtained a product which is throughout all of its portions protected against the deteriorating effect of moisture whether atmospheric or sensible and the wood consituent of which product will retain all of its original and natural properties.

It is preferable that the arrangement of the plies 1 and 5 be such that all portions of the exterior surface of the finished product will comprise one or more of the plies 5 although if it is desired to obtain a product having a wood exterior surface, the arrangement of the plies 1 and 5 may be such that certain of the plies 1 will be exposed at the surfaces of the product rather than the plies 5, as previously pointed out.

It will be understood that while Figure 5 of the drawings illustrates merely a rectangular piece of the composite structure produced by the method, products of various shapes and dimensions may be obtained and that the composite structure may be worked in various ways by various tools.

Having thus described the invention, what is claimed as new is:

1. The method of producing a composite laminated structure which comprises applying a bonding material to a foraminous ply, treating a fibrous ply with a solvent for said bonding material, disposing the plies in contact, and treating the assemblage to cause the solvent to take up a portion of the bonding material.

2. The method of producing a composite laminated structure which comprises applying a bonding material to a foraminous ply, treating a fibrous ply with a solvent for said bonding material, disposing the plies in contact, and subjecting the assemblage to heat to cause the solvent to take up a portion of the bonding material.

3. The method of producing a composite laminated structure which comprises applying a bonding material to a foraminous ply, treating a fibrous ply with a solvent for said bonding material, disposing the plies in contact, and subjecting the assemblage to pressure and thereby cause the solvent to take up a portion of the bonding material.

4. The method of producing a composite laminated structure which comprises applying a bonding material to a foraminous ply, treating a fibrous ply with a solvent for said bonding material in a manner to impregnate the ply with said material, disposing the plies in contact, and treating the same to cause the solvent to take up and incorporate in the fibrous ply a portion of the bonding material.

5. The method of producing a composite laminated structure which comprises applying a bonding material to a foraminous ply, impregnating a fibrous ply with a solvent for said bonding material, disposing the plies in contact, and subjecting the assemblage to pressure whereby to cause the solvent to take up and incorporate in the fibrous ply a portion of the bonding material.

6. The method of producing a composite laminated structure which comprises applying a bonding material to a foraminous ply, treating a fibrous ply, which possesses an appreciable moisture content, with a solvent for said bonding material, disposing the plies in contact, and subjecting the assemblage to heat whereby to convert the moisture content of the fibrous ply into steam and reduce to solvent form the impregnating solvent, and thereby cause the said solvent to take up and incorporate in the fibrous ply a portion of the bonding material.

7. The method of producing a composite laminated structure which comprises applying a bonding material to a foraminous ply, subjecting the said ply and bonding material to pressure whereby to incorporate the ply within the bonding material, and thus form a composite bonding ply, treating a fibrous ply with a solvent for said bonding material, disposing the plies in contact, and treating the assemblage whereby to cause the solvent to take up and incorporate a portion of the bonding material of the said bonding ply.

8. The method of producing a composite laminated structure which comprises applying a rubber bonding material to a foraminous ply, treating a fibrous ply with a rubber solvent, disposing the plies in contact, and subjecting the assemblage to pressure whereby to cause the solvent to take up a portion of the rubber bonding material.

9. The method of producing a composite laminated structure which comprises applying a rubber bonding material to a foraminous ply and treating the same to produce a composite bonding ply, treating a wood ply with a rubber solvent, disposing the plies in contact, and subjecting the assemblage to pressure whereby to vulcanize the rubber bonding material and to cause the solvent to take up a portion of said material.

10. The method of producing a composite laminated structure which comprises applying a layer of rubber bonding material to a foraminous ply, subjecting the same to pressure whereby to incorporate the foraminous ply within the rubber bonding material and thus produce a composite bonding ply, treating a wood ply with a rubber solvent, disposing the plies in contact, and subjecting the assemblage to pressure and heat.

11. The method of producing a composite laminated structure which comprises applying a bonding material to a sheet of mesh material, treating a fibrous ply having a definite grain direction, with a solvent for said bonding material, disposing the plies in contact with the strands of the foraminous sheet extending in non-parallel relation to the fibers of the fibrous ply, and treating the assemblage to cause the solvent to take up a portion of the bonding material.

12. The method of producing a composite laminated structure which comprises applying a bonding material to a foraminous ply, the said foraminous ply being in the nature of mesh material having intersecting strands, treating a plurality of fibrous plies having definite grain direction, with a solvent for said bonding material, arranging the fibrous plies in such relative manner that their fibers will extend in non-parallel relation, disposing between the fibrous plies the bonding ply first mentioned, and treating the assemblage of plies to cause the solvent to take up a portion of the bonding material.

In testimony whereof we affix our signatures.

HARRY N. ATWOOD. [L. S.]
GEORGE B. BAINS, 3D. [L. S.]